United States Patent [19]

Andersson

[11] 3,995,596
[45] Dec. 7, 1976

[54] MOUTHPIECE OF ELASTIC MATERIAL FOR A DRINKWATER VALVE FOR CATTLE

[76] Inventor: Rune Sigvard Andersson, Berchshill, Ossjo 43, S-262 00 Angelholm, Sweden

[22] Filed: Dec. 23, 1974

[21] Appl. No.: 536,939

[52] U.S. Cl. ................................. 119/71; 119/72.5
[51] Int. Cl.² .......................................... A01K 7/06
[58] Field of Search .............. 119/71, 72.5, 75, 72; 222/420, 422, 402.24, 402.23, 402.22, 402.21, 402.12, 490; 128/252

[56] References Cited

UNITED STATES PATENTS

| | | | |
|---|---|---|---|
| 2,800,107 | 7/1957 | Niggeler | 119/71 |
| 3,037,481 | 6/1962 | Kloss | 119/51.5 |
| 3,128,745 | 4/1964 | Alter | 119/75 |

FOREIGN PATENTS OR APPLICATIONS 1,181,480  11/1964  Germany .............................. 119/71

Primary Examiner—Louis G. Mancene
Assistant Examiner—Peter K. Skiff
Attorney, Agent, or Firm—John J. Dennemeyer

[57] ABSTRACT

A mouthpiece of elastic material for a drinkwater valve for cattle has an elastic wall which encloses a water discharge chamber and is provided with one or more water ducts. A valve member extends from the drinkwater valve into the water discharge chamber and is actuated in response to pressure exerted by the cattle on the mouthpiece to admit water into the discharge chamber. Continued pressure on the mouthpiece by the cattle forces the water from the discharge chamber through the water ducts into the mouth of the cattle.

7 Claims, 4 Drawing Figures

MOUTHPIECE OF ELASTIC MATERIAL FOR A DRINKWATER VALVE FOR CATTLE

The present invention relates to a mouthpiece of elastic material for a drinkwater valve for cattle wherein the valve comprises at least one movable member which moves into a position allowing water to flow through a space in the mouthpiece and through the mouthpiece into the animal's mouth when an animal presses its mouth against the mouthpiece, for instance by exerting a gripping pressure on the mouthpiece.

It is already known to provide drinkwater valves with mouthpieces and to design the valves so that the animals can squeeze them with their mouths and actuate a valve member which opens the valve and allows water to flow into the animal's mouth. Such mouthpieces are generally made of a rigid material, and the valve member has a portion which projects from the mouthpiece for actuation of the valve. These known valves include at least one outlet orifice which is often small in diameter in order to prevent water splashing. As a consequence, a residue of water will collect within the mouthpiece after the animal has finished drinking, i.e. after the valve member has returned to its valve-closing position. This residual water will gradually drain off and drip out through the outlet orifice during a relatively long time after drinking, which means that the area beneath the drinkwater valves will always be wet.

It is an object of the present invention to eliminate this drawback and to provide a mouthpiece which retains residual water after drinking, consequently making it unnecessary to provide the area beneath the drinkwater valve with any arrangements for draining off spillwater.

The invention will be described in greater detail hereinafter with reference to the accompanying drawings of which:

Figure 1:
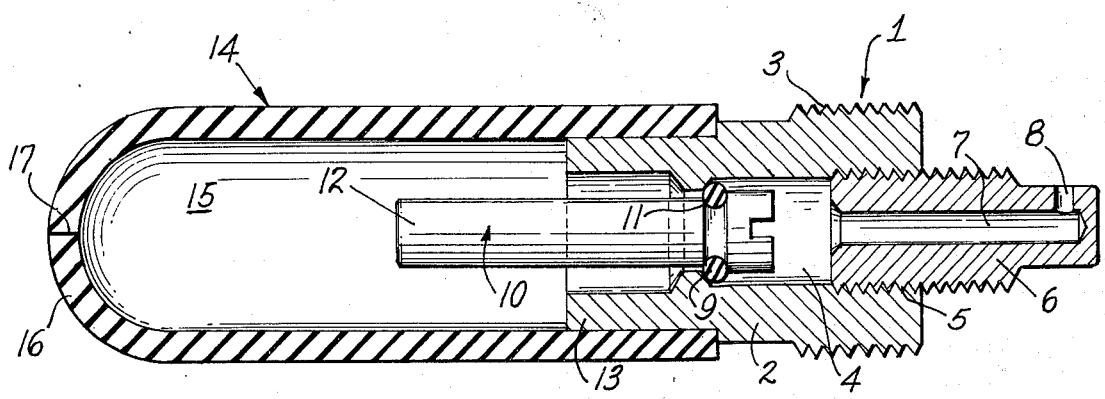
FIG. 1 is a vertical longitudinal sectional view through the drinkwater valve of the present invention.

In the embodiment illustrated in FIG. 1 of the drawings the valve device 1 comprises a cylindrical valve body 2 which is provided externally with screw-threads 3 so that the valve device 1 may be screwed into an internally threaded pipe connection socket (not shown) which is attached to a water supply pipe (not shown). The valve body 2 has a longitudinally extending throughflow passageway 4 which has an inner screw-threaded portion 5 into which an axially projecting extension member 6 is screwed. The extension member 6 is dimensioned to project into the water supply pipe when the valve body 1 is received in the pipe socket, and the extension has an axially extending passageway 7 which communicates with the water supply pipe through at least one radially directed branch passage 8. The passageway 4 has an annular valve seat 9 and an elongated movable valve member 10 is received in this passageway. The valve member 10 has a sealing ring 11 adapted to cooperate with the valve seat 9 and has a smaller diameter than the passageway 4, especially at the enlarged end portion 13 of this passageway. The valve member 10 is also so dimensioned that it projects with a portion 12 by a relatively large amount through the discharge end portion 13 of the passageway 4. The shape of the valve member 10 as thus described ensures, on the one hand, that by means of the water pressure in the supply pipe conduit and/or a coil spring or the like (not shown), this member is kept in a position in which the sealing ring 11 is in sealing engagement with the valve seat 9 and, on the other hand, that by actuation of its portion 12 inwardly and/or laterally, this member can be forced away from said position, causing the sealing ring 11 to leave the seat completely or partially and open the valve.

The specific design of the valve illustrated herein can vary within wide limits. Thus, for instance, the valve may be formed with a flange for engaging the outer peripheral surface of the water supply pipe, and at the same time the extension 6, on the one hand, is dimensioned to extend transversely across the bore of the water supply pipe and, on the other hand, is provided externally with screw-threads for receiving a nut which, when tightened, forces a sleeve against the side of the water supply pipe which is disposed at the opposite side of the flange. Alternatively, the valve can be secured to the water supply pipe by a clamp or the like. The outer end portion 12 of the valve member 10 can be omitted and replaced by a part projecting through a radially directed hole in the valve body 2, and this part may be so dimensioned that its outer end is flush with the outer surface of the valve body when the valve member is in its closed position. Independently of what type of valve is used, it is of advantage that the inlet opening or openings of the through-flow passageway are equal to or smaller than the annular space between the sealing ring and the valve seat when the valve is open. This will provide that any foreign matter which might enter through the inlet opening can also be carried out past the valve seat.

The corresponding end portion of a mouthpiece 14 of elastic material, preferably of rubber, is fitted on the outer end portion of the valve body 2. This mouthpiece is secured to the valve body by glueing or by means of a clamping ring (not shown), a threaded sleeve (not shown), a ring provided with a bead, a bayonet fitting, a snap ring, a tapering ring, or in any other suitable way. It is essential that the mouthpiece 14 is securely held on the valve body, but it has been found in practice that generally the mouthpiece will remain in place with any of the devices just indicated, and therefore no one particular such device has been illustrated in the drawing.

According to the invention, the mouthpiece 14 is designed to define a space or enclosure 15 which communicates with the passageway 4 of the valve 1. The wall 16 of the mouthpiece 14 is provided at one point thereof, at least, with a nipple or a pinhole 17 extending from the enclosure 15 and opening in the outer surface of the wall 16. The pinhole 17 is so formed, and the mouthpiece 14 has such a degree of elasticity that the pinhole 17 will allow water to flow therethrough from the space 15 and into the animal's mouth as the valve 1 is opened and water flows into the space 15, and by the action of the animal in pushing or sucking on the mouthpiece 14. The mouthpiece 14 has a degree of elasticity such that the pinhole will reclose by elastic contraction as the water flow into the space 15 is interrupted or the pushing or suction force exerted by the animal ceases. As a result of the elasticity of the mouthpiece 14 the valve member 10 is displaced to open the valve 1 as the animal presses its mouth against the mouthpiece 14 and causes the outflowing water to pass through the space 15 and the expanded pinhole 17 into the animal's mouth. When the pressure of the animal's mouth against the mouthpiece 14 is interrupted, i.e. when the animal has finished drinking, the water still remaining in the space 15 will be locked in, so that any water spillage after finished drinking will be eliminated and the valve will be drip-free.

Figure 1A:
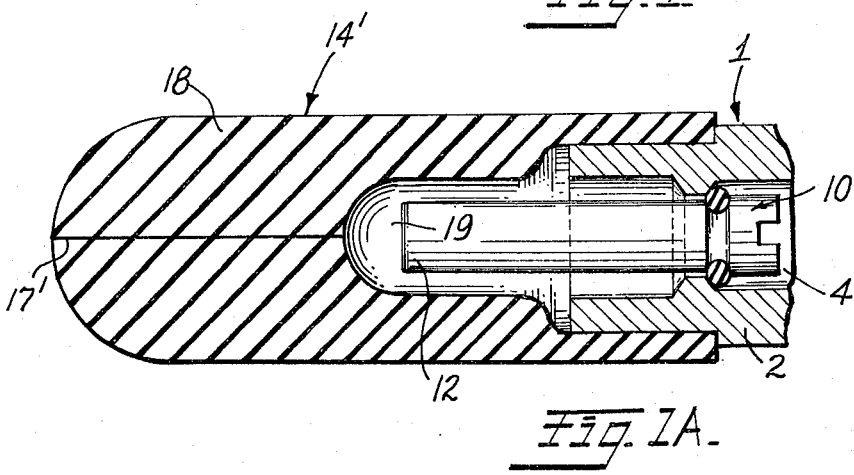
FIG. 1A is a fragmentary vertical section, similar to FIG. 1, but showing a modification of the mouthpiece.

In the drawings, a thin-walled mouthpiece 14 is illustrated in FIG. 1. In this embodiment the space 15 constitutes a relatively large whirl or turbulence chamber which may often be of advantage for reducing an excessive water splash or jet effect into the animal's mouth. The embodiment illustrated in FIG. 1A illustrates a wall 18 defining a smaller space 19, while the outer contour of the mouthpiece 14' remains unchanged, and in this embodiment the pinhole 17 is extended through this wall 18. This space 19 provides a slightly lower turbulence effect, but any water splash or jet effect will be counteracted by the substantially extended pinhole length.

The elongated form of mouthpiece 14 illustrated in the drawings is advantageous but may be varied, and similarly the size of the space 15 or 19 can be varied depending on the water pressure, the through-flow capacity of the valve, and the like.

Figure 2:
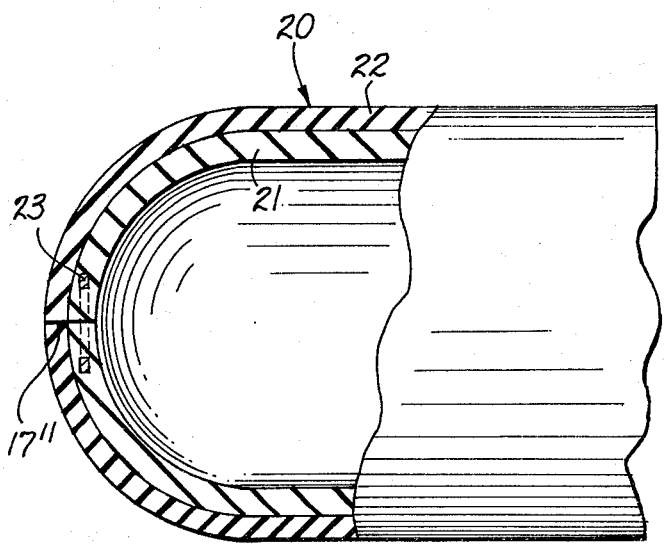
FIG. 2 is an enlarged fragmentary elevational view, partly in sectional of a further modification of the mouthpiece.
Figure 3:
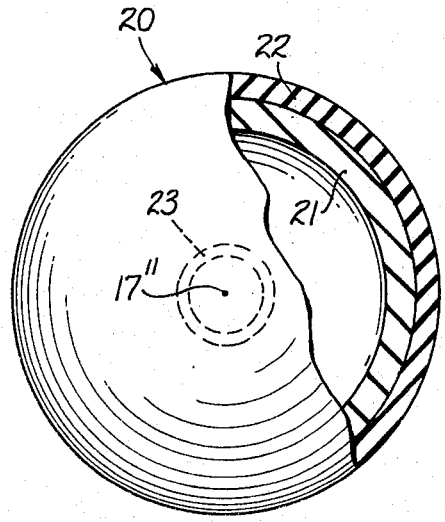
FIG. 3 is an end elevational view, partly in section, of the mouthpiece of FIG. 2.

In the embodiment shown in FIGS. 2 and 3, the mouthpiece 20 comprises two layers 21, 22 of different elasticity. The layer 21 defining the inner wall of the mouthpiece 20, is preferably made of a material of great elasticity, and the layer 22 defining the outer wall is made of a material of lower elasticity.

Instead of two separate layers, the mouthpiece 20 may comprise a core of a single material of relatively great elasticity, the outer portion of which is of a lower elasticity than the inner portion which it surrounds. Whether the mouthpiece 20 comprises two separate layers of different elasticity or comprises a core wherein the outer portion is of an elasticity different from the inner portion, the risk for rapid wear through assault from outside is eliminated, while at the same time the necessary elastic properties are obtained.

In order to ensure that the pinhole or nipplehole 17 is closed after drinking, spring means 23 may be embedded or cast in the mouthpiece so as to surround the pinhole 17 and permit it to open when the animals drink. Said spring means 23 may consist of one or more rubber inserts or rings of elastic material functioning like ring muscles.

The embodiments thus described are preferable from the point of view of design and practical use, but may be varied within the scope of the appended claims. Thus, for instance, the mouthpiece 14 may consist entirely or in part of a material other than rubber, and the water discharge through the wall of the mouthpiece 14 may be through pin or nippleholes or in any other suitable way, which will ensure closure after drinking. Finally, in order to obtain a ring muscle effect, it is possible to embed more than one spring member into the mouthpiece 14.

What is claimed is:
1. A drinking valve for cattle comprising:
a cylindrical valve body having an inlet portion and a discharge portion extending therefrom, an internal through-flow passageway communicating between said portions and an internal valve seat formed in said passageway between said portions; said inlet portion including means for connecting said valve body to a liquid supply;
an elastic mouthpiece comprising an outer wall of a material of low elasticity and an inner wall of a material of substantial elasticity, defining an enclosure, secured to the discharge portion of said valve body and having a closable aperture at the end of said enclosure opposite said valve body, said closable aperture capable of separating said enclosure from the external atmosphere;
an elongated movable valve member received in the through-flow passageway of said valve body and having a portion thereof projecting through said discharge portion into said enclosure;
a sealing ring set in said valve member cooperating with said valve seat to effectively close the through-flow passageway of the valve body thereby separating that portion of the through-flow passageway in the inlet portion of the valve body from that portion of the through-flow passageway in the discharge portion of the valve body and from the enclosure when said elongated valve member is held in a closed valve position, said elongated valve member capable of being held in a closed valve position solely by the pressure of liquid in the inlet portion of the valve body; the portion of said movable valve member projecting into said enclosure being in a spaced relationship with said elastic mouthpiece;
said elongated member capable of being moved into an open valve position by a drinking animal applying sideways pressure through the elastic mouthpiece against the projection portion of said valve member.
2. A drinking valve for cattle comprising:
a cylindrical valve body having an inlet portion and a discharge portion extending therefrom, an internal through-flow passageway communicating between said portions and an internal valve seat formed in said passageway between said portions; said inlet portion including means for connecting said valve body to a liquid supply;
a resilient elastic mouthpiece defining an enclosure, secured to the discharge portion of said valve body and having a closable aperture at the end of said enclosure opposite said valve body, an annular spring pressure ring surrounding said aperture, said closable aperture capable of separating said enclosure from the external atmosphere;
an elongated movable valve member received in the through-flow passageway of said valve body and having a portion thereof projecting through said discharge portion into said enclosure;
a sealing ring set in said valve member cooperating with said valve seat to effectively close the through-flow passageway of the valve body thereby separating that portion of the through-flow passageway in the inlet portion of the valve body from that portion of the through-flow passageway in the discharge portion of the valve body and from the enclosure when said elongated valve member is held in a closed valve position, said elongated valve member capable of being held in a closed position solely by the pressure of liquid in the inlet portion of the valve body; the portion of said movable valve member projecting into said enclosure being in a spaced relationship with said elastic mouthpiece;

said elongated member capable of being moved into an open valve position by a drinking animal applying sideways pressure through the elastic mouthpiece against the projecting portion of said valve member.

3. A drinking valve as described in claim 2 wherein the discharge portion of said valve body is considerably larger than the portion of the valve member projecting therethrough.

4. A drinking valve as described in claim 2 wherein the elastic mouthpiece comprises an elongated body, and wherein the enclosure defined by the elastic mouthpiece is in the immediate vicinity of the discharge portion of the valve body so that the wall of the enclosure is proximate that portion of said valve member projecting into the enclosure.

5. A drinking valve as described in claim 2 wherein said aperture is a pin hole passing through the wall of said mouthpiece.

6. A drinking valve as described in claim 2 wherein the mouthpiece has the shape of a rubber sleeve, one end thereof fitted onto said discharge portion and secured thereon by a retainer member.

7. A drinking valve as described in claim 2 wherein the mouthpiece has the shape of a rubber sleeve, one end thereof fitted onto said discharge portion and secured thereon by a binding agent.

* * * * *